United States Patent
Alapuranen et al.

(10) Patent No.: US 7,561,542 B2
(45) Date of Patent: Jul. 14, 2009

(54) SYSTEM, METHOD AND APPARATUS FOR DETERMINING IF DATA FROM A SOURCE HAS ARRIVED PROPERLY AT A DESTINATION IN A TIME DIVISION MULTIPLEX (TDM) COMMUNICATION NETWORK

(75) Inventors: Pertti O. Alapuranen, Detona, FL (US); Robin U. Roberts, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 389 days.

(21) Appl. No.: 11/383,013

(22) Filed: May 12, 2006

(65) Prior Publication Data

US 2007/0263570 A1    Nov. 15, 2007

(51) Int. Cl.
 *H04B 7/212* (2006.01)
(52) U.S. Cl. .................. 370/321; 370/345; 370/347; 370/330; 455/450; 455/509
(58) Field of Classification Search ................ 370/252, 370/321, 328–329, 337–338, 347–348, 294, 370/458; 714/746–750, 776; 455/450, 509
See application file for complete search history.

(56) References Cited

U.S. PATENT DOCUMENTS

| | | | | |
|---|---|---|---|---|
| 5,680,388 A | * | 10/1997 | K.ang.hre | ..................... 370/329 |
| 5,732,076 A | | 3/1998 | Ketseoglou | |
| 6,388,997 B1 | * | 5/2002 | Scott | ........................... 370/347 |
| 2005/0172199 A1 | * | 8/2005 | Miller et al. | ................. 714/749 |
| 2005/0195849 A1 | * | 9/2005 | Rajkotia et al. | ............. 370/428 |
| 2005/0201319 A1 | * | 9/2005 | Lee et al. | ..................... 370/321 |
| 2005/0260998 A1 | * | 11/2005 | Casaccia et al. | .......... 455/452.2 |

\* cited by examiner

*Primary Examiner*—Kamran Afshar
(74) *Attorney, Agent, or Firm*—Randi L. Karpinia

(57) ABSTRACT

A first time division multiplex (TDM) time slot is provided which is defined as a bi-directional channel for use in a TDM network including a source node and a destination node. The source node can transmit data to the destination node in a first portion of a first TDM time slot. In one implementation, a second portion of the same first TDM time slot can be reserved for the destination node to transmit information to the source node. The destination node can determine whether the data from the source node has arrived properly, and then transmit an indication message to the source node in the second portion of the same first TDM time slot to indicate whether the data from the source node has arrived properly at the destination node.

20 Claims, 5 Drawing Sheets

SYSTEM, METHOD AND APPARATUS FOR DETERMINING IF DATA FROM A SOURCE HAS ARRIVED PROPERLY AT A DESTINATION IN A TIME DIVISION MULTIPLEX (TDM) COMMUNICATION NETWORK

FIELD OF THE INVENTION

The present invention relates generally to communications and more particularly to techniques for determining if data from a source node has arrived properly at a destination node in time division multiplex (TDM) network.

BACKGROUND

A commonly used technique within modern radio networks is Time Division Multiplexing (TDM). At the physical layer, this is known as Time Division Multiple Access (TDMA). In TDMA-based networks, the same physical channel can be shared by several different nodes. The physical channel is divided into slices of time called time slots. TDMA protocols can be used to assign a time slot to nodes in the network. These time slots can be reserved and accessed by the different nodes on a cyclical basis. Each node transmits only in its reserved time slot on a cyclical basis. For example, circuit switched TDMA-based voice systems usually allocate a single timeslot in a frame for a single voice connection for a period of time. By contrast, systems which tend to carry bursty data typically use dynamic allocation schemes to assign timeslots. For instance, Demand Assigned Multiple Access (DAMA) systems can be used to allocate timeslots on demand.

In some networks, such as a wired Ethernet network, a source node can immediately sense if its transmission has collided with another node's transmission on the wire. If a collision is not detected, the source node knows the packet has been delivered, and if a collision is detected, the source node will retry delivery.

In other networks, such as a wireless network, a source node can not directly detect whether there is a collision at a destination node. Rather, higher layer protocols must wait for the destination node to respond in another different time slot. This introduces delay (e.g., waiting for the response), inefficiency (e.g., requires another slot), and complicates recovery from a failure. This can be problematic especially when applied in systems transporting time sensitive data, such as interactive voice/video, and non-interactive data, such as one way audio/video at variable modulation and high data rates.

BRIEF DESCRIPTION OF THE FIGURES

The accompanying figures, together with the detailed description form part of the specification, and serve to further illustrate various embodiments and to explain various principles and advantages in accordance with the present invention.

DETAILED DESCRIPTION

Figure 1:
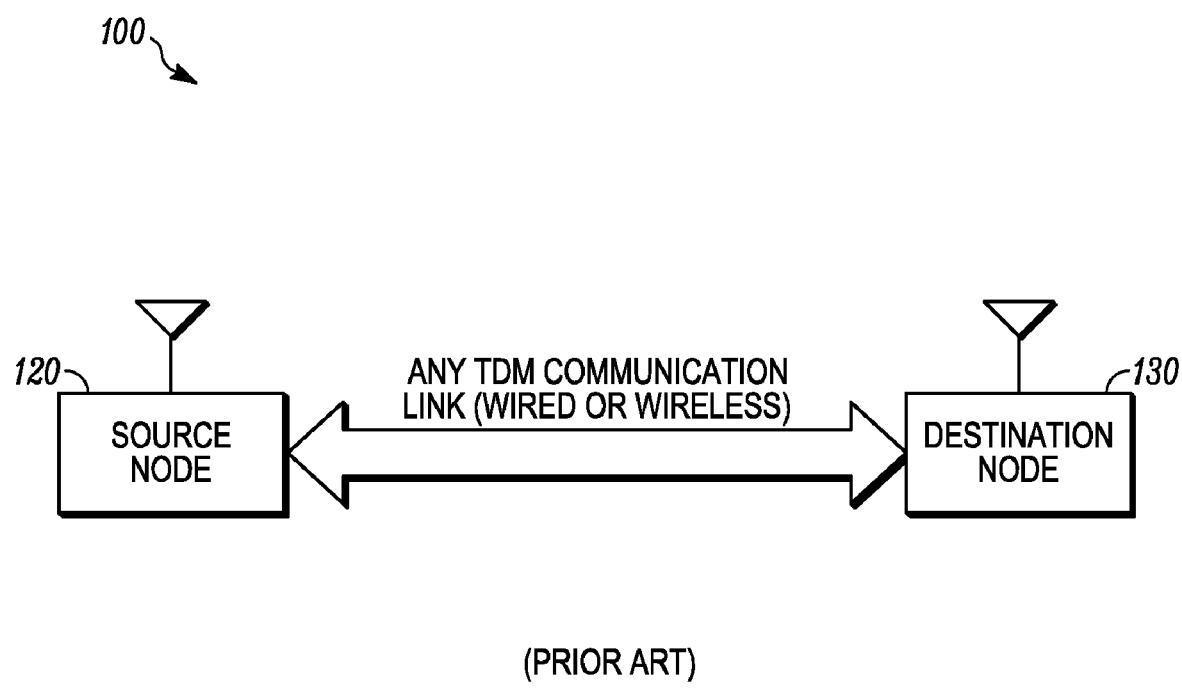
FIG. 1 is a block diagram of an exemplary time division multiplex (TDM) communication network.

Before describing in detail embodiments that are in accordance with the present invention, it should be observed that the embodiments reside primarily in combinations of method steps and apparatus components related to determining whether data from a source node has arrived properly at a destination node in time division multiplex (TDM) network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions for determining whether data from a source node has arrived properly at a destination node in time division multiplex (TDM) network as described herein. The non-processor circuits may include, but are not limited to, a radio receiver, a radio transmitter, signal drivers, clock circuits, power source circuits, and user input devices. As such, these functions may be interpreted as steps of a method for determining whether data from a source node has arrived properly at a destination node in time division multiplex (TDM) network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In this document, relational terms such as first and second, front and last, beginning and end, and the like may be used solely to distinguish one entity or action from another entity or action without necessarily requiring or implying any actual such relationship or order between such entities or actions. The use of these relational terms and the like in the description and the claims may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Overview

It would be desirable to provide techniques for improving performance of a TDM system by improving the efficiency of upper protocol layers (e.g., signaling layers).

According to one aspect, the physical layer provides real-time status information regarding whether a time slot was successfully delivered. The real-time status information can then be reported to the higher protocol layers, and the higher layers can then determine what happens in the event the time slot was not delivered successfully (e.g., perform Automatic Repeat reQuest (ARQ)). By contrast, in a conventional TDM environment, acknowledgements can only occur at a later time since no real-time transmit status is available.

According to another aspect of the present invention, a single TDM time slot is defined as a bi-directional channel. A first part or portion of the TDM time slot functions as a forward channel for sending data from a source node to a destination node. A small portion at or near the end of the same TDM time slot can be reserved for the destination node to indicate whether the data sent by the source node arrived properly (e.g., a slot ACKnowledgment (ACK)). In other words, part of the TDM time slot can be reserved for the destination node to report whether the source node's data arrived properly at the destination node. This allows the physical layer to know (1) whether the data payload has been successfully delivered (ACK), or (2) whether the destination node has detected a problem with the data payload (Negative Acknowledgment (NACK)). In cases where the source node does not receive any response from the destination node (e.g., the destination node fails to receive anything from the source node), the source node can assume there was a problem with the data payload (e.g., a lost packet). This TDM slot structure can be used to provide interference detection. This TDM slot structure can also allow for increased efficiency at higher layer protocols since the physical layer (PHY) reports the transmission status, and the higher layer protocols can act on it immediately. Conventional ACK mechanisms (e.g., those without the slot ACK mechanism) can be relatively inefficient since higher layer protocols must wait for the destination node to respond in another different time slot, which introduces delay time in waiting for the response, and complicates recovery from a failure.

Exemplary TDM Communication Network

FIG. 1 is a block diagram of an exemplary TDM communication network 200 which comprises a source node 120 and a destination node 130 which communicate with one another over a TDM link or channel. The TDM link can be wired or wireless. For instance, in one implementation, the source node 120 and destination node 130 can be nodes in a wireless TDM network (e.g., a communication device and base station or vice-versa) and can communicate information packets over a communication medium in accordance with a TDM-based multiple access scheme. Alternatively, in another implementation, the source node 120 and destination node 130 can be nodes in an ad hoc communication network where the nodes each have repeater and routing capability.

The nodes 120, 130 can generally be devices capable of receiving packetized audio, video and/or data information. The nodes can exchange information as data packets transmitted over one or more communication channels. Some of the components in an exemplary node, such as an exemplary processor, transmitter, receiver and antenna, are described below with reference to FIG. 2.

Figure 2:
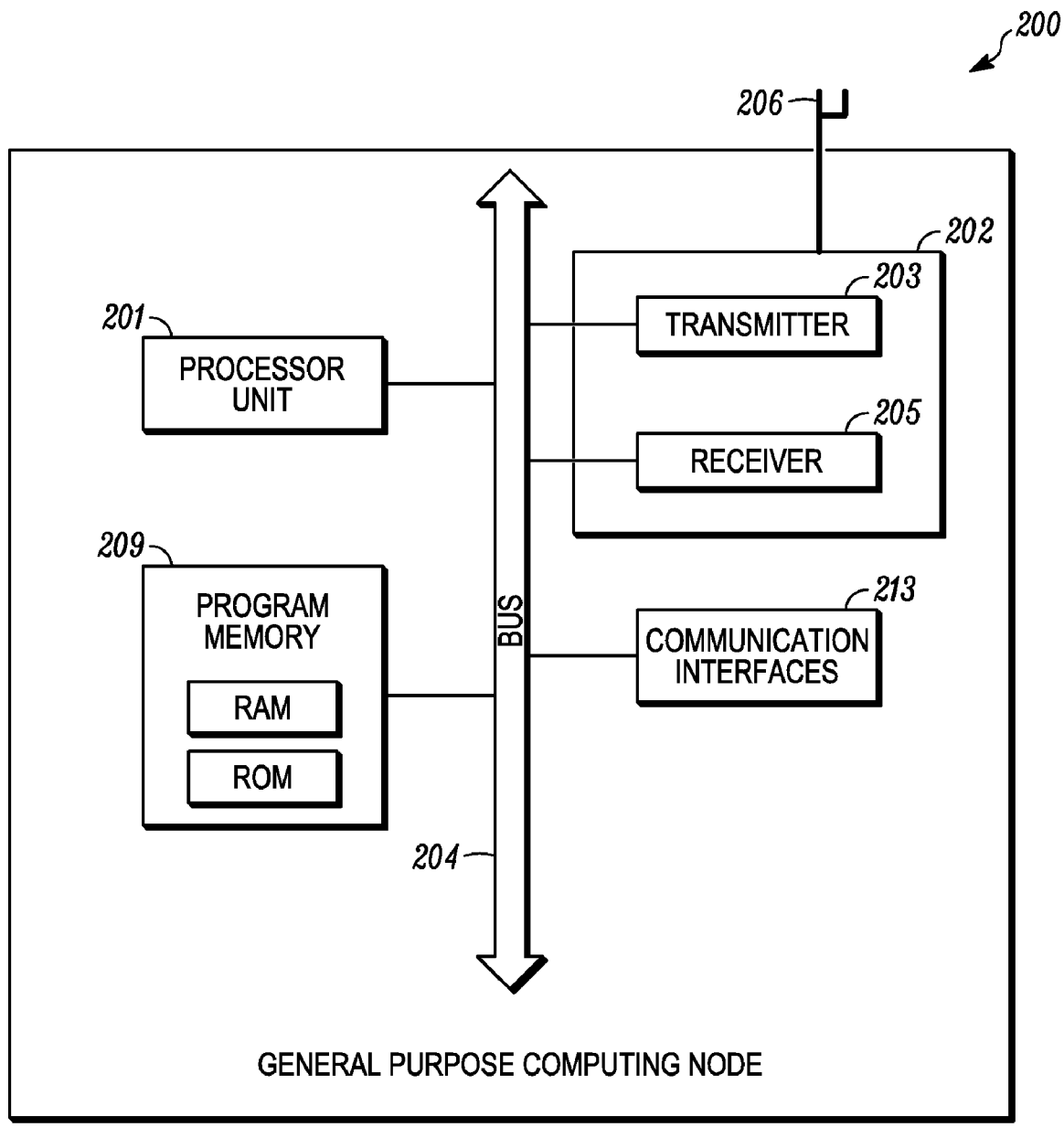
FIG. 2 is a block diagram of an exemplary general purpose computing node.

FIG. 2 is a block diagram of an exemplary general purpose computing node 200 in accordance with some embodiments of the invention. The node 200 comprises a processor 201, a transceiver 202 including a transmitter circuitry 203 and a receiver circuitry 205, an antenna 206, a program memory 209 for storing operating instructions that are executed by the processor 201, and one or more communication interfaces 213. Although not shown, the node 200 also preferably includes an antenna switch, duplexer, circulator, or other highly isolative means (not shown) for intermittently providing information packets from the transmitter circuitry 203 to the antenna 206 and from the antenna 206 to the receiver circuitry 205. The node 200 is preferably an integrated unit containing at least all the elements depicted in FIG. 2, as well as any other elements necessary for the node 200 to perform its particular functions. Alternatively, the node 200 may comprise a collection of appropriately interconnected units or devices as is well known in the art, wherein such units or devices perform functions that are equivalent to the functions performed by the elements of the node 200. For example, the node 200 may comprise a laptop computer and a LAN (local area network) card.

The processor 201 preferably includes one or more microprocessors, microcontrollers, DSPs (digital signal processors), state machines, logic circuitry, or any other device or devices that process information based on operational or programming instructions. Such operational or programming instructions are preferably stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include conventional circuitry to enable digital or analog transmissions over a communication channel.

The implementations of the transmitter circuitry 203 and the receiver circuitry 205 depend on the implementation of the node 200. For example, the transmitter circuitry 203 and the receiver circuitry 205 can be implemented as an appropriate modem, or as conventional transmitting and receiving components of two-way communication devices. When the transmitter circuitry 203 and the receiver circuitry 205 are implemented as a modem, the modem can be internal to the node 200 or operationally connectable to the node 200 (e.g., embodied in a radio frequency (RF) modem implemented on a Personal Computer Memory Card International Association (PCMCIA) card). For a communication device, the transmitter circuitry 203 and the receiver circuitry 205 are preferably implemented as part of the device hardware and software architecture in accordance with known techniques. Most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is capable of receiving wired or wireless signals within at least one frequency bandwidth and optionally more bandwidths, if the communications with a proximate node are in a frequency band other than that of the network communications. The receiver circuitry 205 may optionally comprise a first receiver and a second receiver, or one receiver capable of receiving in two or more bandwidths. The transceiver 202 includes at least one set of transmitter circuitry 203. The at least one transmitter 203 may be capable of transmitting to multiple devices on multiple frequency bands. As with the receiver 205, dual transmitters 203 may optionally be employed, where one transmitter is for the transmission to a proximate node or direct link establishment to wireless local area networks (WLANs), and the other transmitter is for transmission to a cellular base station.

The antenna 206 comprises any known or developed structure for radiating and receiving electromagnetic energy in the frequency range containing the carrier frequencies.

Exemplary Framing Structure

Figure 3:
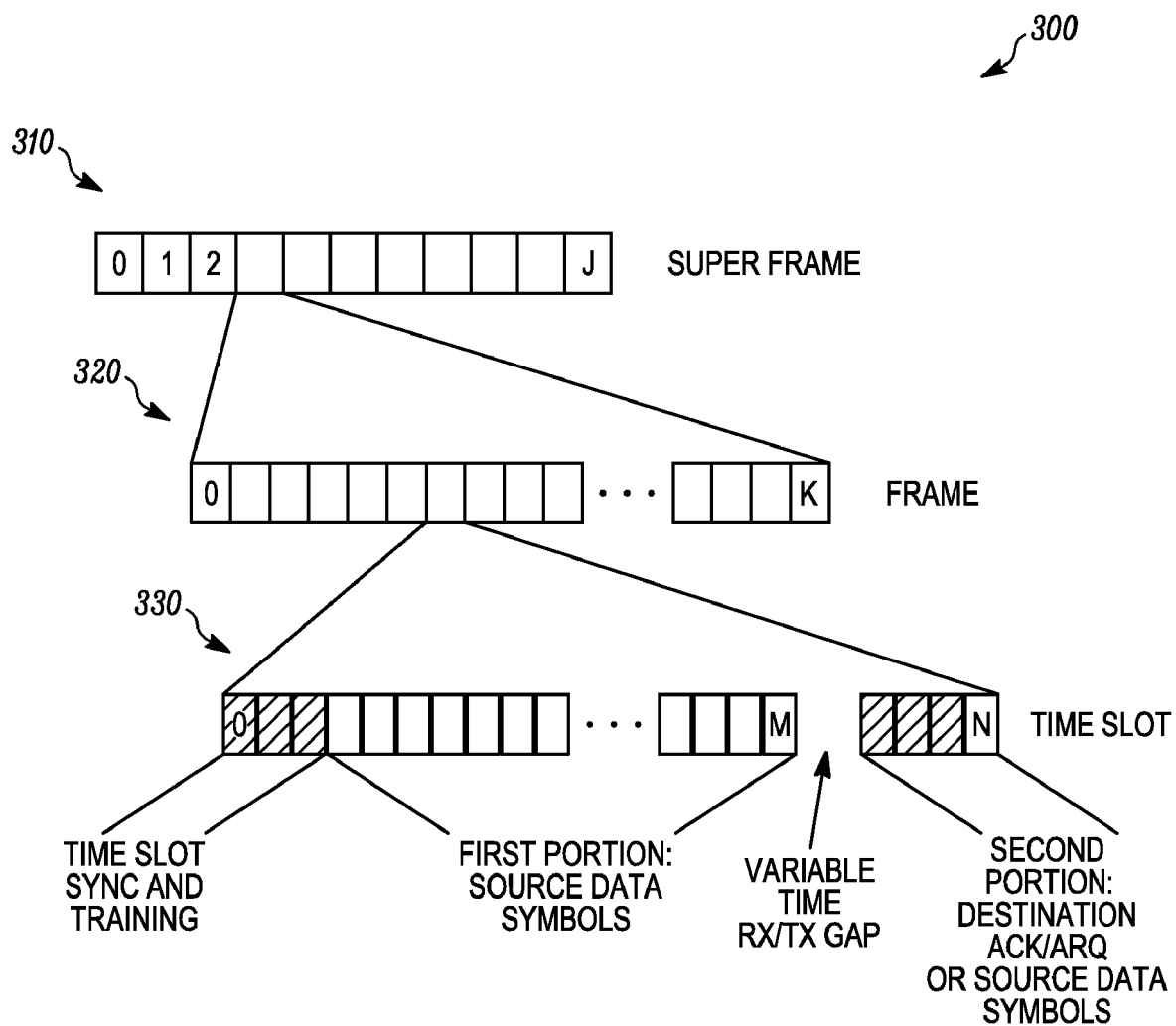
FIG. 3 shows an exemplary multi-level framing structure according to one exemplary implementation of the present invention.

FIG. 3 shows an exemplary multi-level framing structure 300 according to one exemplary implementation of the present invention. In this exemplary framing structure, to provide a repetitive timing reference, a group of time slots (0 . . . K) form a frame 320, and a group of frames (0 . . . J) can form a super frame 310. In other words, the channel comprises a superframe 310 comprising a plurality of frames (0-J). Each frame (0-J) 320 comprises a plurality of timeslots (0-K). Each timeslot (0-K) 330 comprises a plurality of symbols (0-N). In one possible non-limiting implementation of this multi-level framing structure 300, each super frame 310 can be approximately five hundred (500) milliseconds (ms) in length and can be divided into fifty (50) time frames each of which are approximately ten (10) ms in duration. Each of the fifty (50) time frames can be further sub-divided into thirty five (35) timeslots. It will be appreciated that in alternative implementations, the super frame 310, each of time frames, and time slots could be of different durations, and that there could different number of time frames and time slots.

A time division multiplex (TDM) time slot 330 is provided which is defined as a bi-directional channel for use in a TDM network 100 including a source node 120 and a destination node 130. The TDM time slot 330 includes a first portion, a second portion, and, optionally, a variable time gap between the first portion and the second portion. The source node 120 can transmit data to the destination node 130 in the first portion of the TDM time slot 330. Depending on how the source node 120 chooses to use the second portion, the second portion can either be (1) reserved for the destination node 130 to transmit ACK information to the source node 120 or (2) used by the source node 120 to transmit data from the source node 120 to the destination node 130.

In the latter case, the second portion can be used for transmitting extra data from the source node 120 to the destination node 130. For example, if the link between the source node 120 and the destination node 130 is very reliable and is fixed, then some communications may not require that the second portion is used for ACK information. When the ACK information is not required, this permits an increase in the capacity of the time slot 330 from M to N, as shown in FIG. 3. The time slot 330 can then carry extra data symbols equal to the variable receiver/transmitter (RX/TX) time gap, a reverse training sequence (not shown), and the ACK symbol.

In the former case, the source node 120 can reserve symbol(s) in the second portion of the same TDM time slot 330 for the destination node 130 to use to "transmit back," "answer," "respond" or "reply" to the source node 120 in the same time slot 330 (as opposed to another or later time slot).

As shown in FIG. 3, each time slot (0 . . . K) supports ACK information that the receiving destination node 130 sends back to transmitter source node 120. The channel is turned around, during the variable RX/TX time gap, then the destination node 130 replies back to the source node 120 with either an ACK or NACK in the second portion. For example, in some cases, only the last symbol needs to be used to transmit ACK information from the destination node 130.

The variable RX/TX time gap can be used to manage the amount of time the destination node 130 is allowed before it responds in the second portion. In other words, the variable RX/TX time gap allows the amount of time the destination node 130 has to respond to be "tuned."

Since this "slot ACK" mechanism is being used to report whether the forward data transmitted by the source node 120 was received correctly by the destination node 130, the data is decoded and verified to be correct at the destination node 130 before the ACK is sent. Significant hardware resources are required to implement this "slot ACK" mechanism within the very tight time frames. One way to overcome this issue is to relax timing requirements by extending the time after the forward channel (or first portion) is transmitted, but before the reverse channel slot ACK (or second portion) is transmitted. This can be done by extending the variable RX/TX time gap, but at a tradeoff of additional fixed overhead in the slot.

Although not shown in FIG. 3, the time slot 330 can also include a plurality of other fields. In one exemplary implementation, a slot can include: <forward frame sync><forward fine sync><control header><forward payload><gap><reverse frame sync><reverse fine sync><reverse acknowledgment>, where <forward payload>, <gap> and <reverse acknowledgment> correspond to the first portion, the variable time gap, and the second portion, respectively, and <forward frame sync>, <forward fine sync>, <control header>, <reverse frame sync>, and <reverse fine sync> are other fields which can be included but are not shown in FIG. 3. The time slot 330 could also include additional fields for additional addressing and for additional signal processing.

Moreover, the destination node 130 can be specifically addressed so that only the addressed destination node 130 will send an ACK to the source node 120. This can prevent multiple nodes from sending ACKs or NACKs to minimize collisions. The address can be carried, for instance, in the <control header> or other portion (not shown) of the time slot 330. Placing this address before (e.g., in front of the forward payload) can give the destination node 130 as much time as possible to prepare.

It will be appreciated that in the description herein, and in the claims that follow, the terms "first," "second," and the like may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. For instance, while the following description refers to a first portion of a first TDM time slot 330 and a second portion of the same first TDM time slot 330, it will be appreciated that the term "first TDM time slot" should not be construed to imply position within the frame 320. Rather, every slot (0 . . . K) in the frame 320 can support the mechanism, regardless of position in the frame 320. Moreover, there can be other intervening portions between the first portion of the first TDM time slot 330 and the second portion of the same first TDM time slot 330. The data from the source node 120 is sent in the first portion the first TDM time slot 330 (e.g., near the beginning of the slot 330) which precedes another (e.g., second) portion of the same TDM time slot 330 (e.g., toward the end), in which a response from the destination node 130 can be sent at a later time after the first portion. In some implementations, the second portion corresponds to the end of the same first TDM time slot 330.

Figure 4:
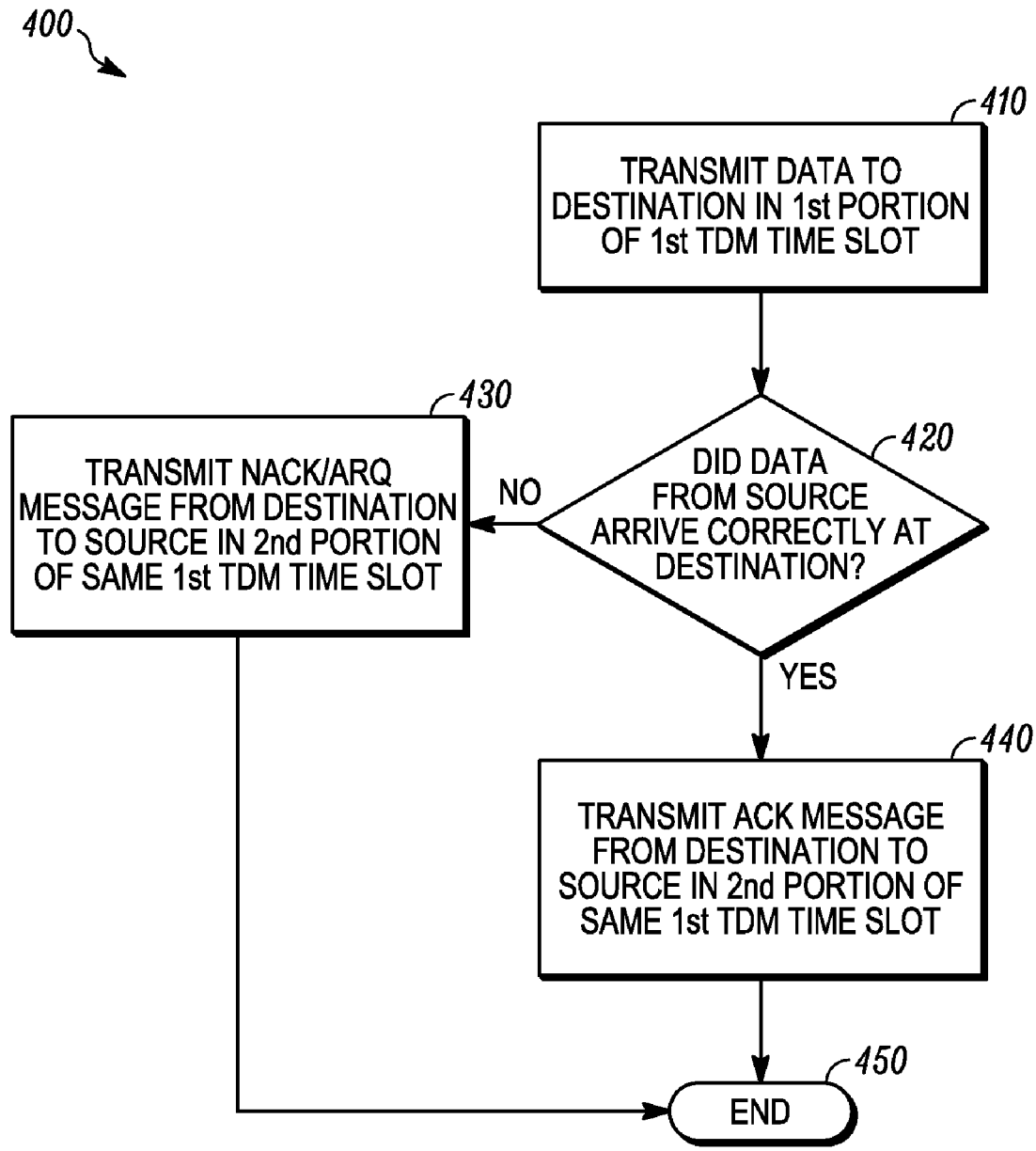
FIG. 4 is a flowchart showing an exemplary method for determining whether data from a source node has arrived properly at a destination node in time division multiplex (TDM) network in accordance with some embodiments of the invention.

FIG. 4 is a flowchart showing an exemplary method 400 for determining whether data from a source node 120 has arrived properly at a destination node 130 in time division multiplex (TDM) network in accordance with some embodiments of the invention.

At step 410, the source node 120 can transmit data to the destination node 130 in a first portion of a first TDM time slot. In this embodiment, the second (e.g., last) portion of the same first TDM time slot is reserved for the destination node 130 to transmit information to the source node 120. This information can be "an indication message" (e.g., ACK message or NACK message). At step 420, if the destination node 130 receives a transmission from the source node 120, the destination node 130 can determine whether the data from the source node 120 has arrived properly (e.g., whether data were received correctly without errors). The destination node 130 can then transmit the indication message to the source node 120 in the second portion of the same first TDM time slot. The indication message indicates whether the data from the source node 120 has arrived properly at the destination node 130. Immense advances in processing power can allow the destination node 130 to validate the data in a very short real-time interval.

For example, when the destination node 130 decodes the data and determines that the data from the source node 120 has not arrived properly, then at step 430, the destination node 130 can transmit a negative acknowledgement (NACK) message from the destination node 130 to the source node 120 in the second portion of the same first TDM time slot to indicate that the data from the source node 120 has not arrived properly at the destination node 130. The process 400 then ends at step 450.

Alternatively, when the destination node 130 decodes the data and determines that the data from the source node 120 has arrived properly, then at step 440, the destination node 130 can transmit an acknowledgement (ACK) message from the destination node 130 to the source node 120 in the second portion of the same first TDM time slot. The ACK message acknowledges that the data from the source node 120 has arrived properly at the destination node 130 (e.g., to notify the source node 120 that previously transmitted data were received correctly without errors). The process the ends at step 450.

Upon receiving the status information (e.g., ACK or NACK or no response), the source node 120 may report the status information to a higher layer which can decide what to do based on the status information (e.g., either discard or perform an ARQ to retransmit).

In one implementation, the destination node 130 sends the ACK or NACK at the end of (e.g., last portion of) the same first TDM time slot, however, the ACK/NACK could also be transmitted near the last portion or part of the first TDM time slot and other information can be transmitted in the last part of the first TDM time slot.

Figure 5:
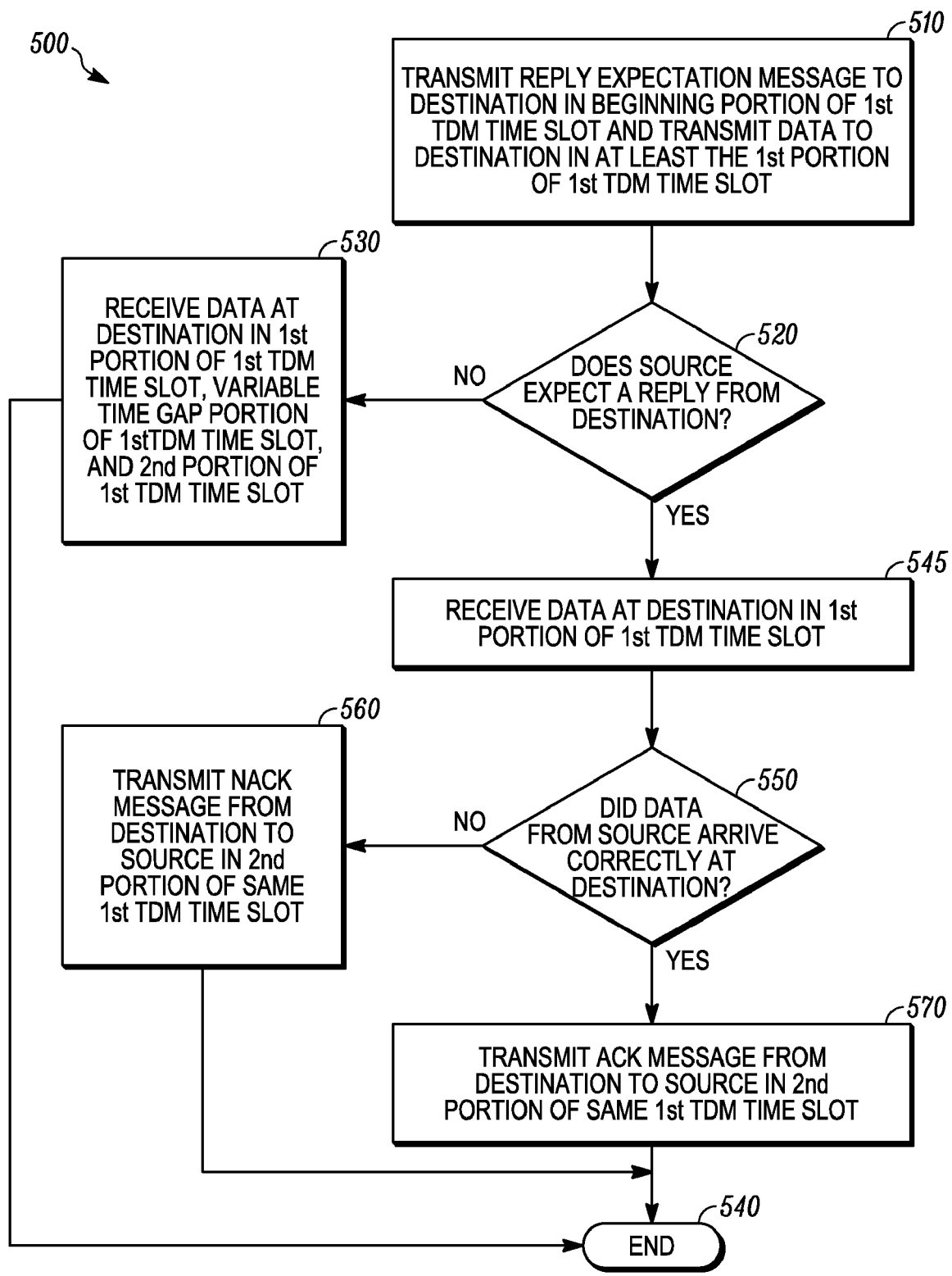
FIG. 5 is a flowchart showing an exemplary method for determining whether data from a source node has arrived properly at a destination node in time division multiplex (TDM) network in accordance with some other embodiments of the invention.

FIG. 5 is a flowchart showing an exemplary method for determining whether data from a source node 120 has arrived properly at a destination node 130 in time division multiplex (TDM) network in accordance with some embodiments of the invention.

The slot ACK/NACK introduces fixed overhead since it appears in every time slot. Always transmitting the slot ACK/NACK can be wasteful in some scenarios since there are certain protocols where the slot ACK/NACK cannot be used, or where an ACK/NACK is not useful.

To address this issue, at step 510, the source node 120 can transmit a reply expectation message in a beginning portion of a first TDM time slot, and can transmit data to the destination node 130 in at least a first portion of the first TDM time slot.

The source node 120 can indicate in the beginning portion of the first TDM time slot that the variable time gap and the last portion of the same first TDM slot will be used to transmit data from the source node 120 to the destination node 130. In other words, if the source node 120 does not expect and want the destination node to send a reply in the second portion of the same first TDM time slot, the source node 120 can tell the destination node 130 that the source node 120 has sent additional data using the variable time gap and second portion of the first TDM time slot.

Alternatively, the source node 120 can indicate in a portion at or near the beginning of the first TDM time slot that a reply message is expected to be returned from the destination node 130. For instance, the source node 120 can indicate in the beginning portion of the first TDM time slot that the source node 120 expects a reply message (e.g., ACK message or NACK message) from the destination node 130. A second (e.g., last) portion of the same first TDM time slot can be reserved for the destination node 130 to transmit information to the source node 120. The destination node 130 can transmit the reply message (e.g., ACK message or NACK message) in the last portion of the same first TDM time slot.

For example, in one implementation, two bits can be sent in the beginning portion of the forward part of the first TDM time slot that indicate whether the ACK message or NACK message is required, or whether the forward channel is extended to the end of the first TDM time slot. For instance, the first bit can indicate that the destination node 130 has to respond, saving processing time on both ends. The second bit can indicate that the forward channel uses the entire first TDM time slot, by also using what would have been the reverse channel at the second (e.g., end) portion of the first TDM time slot. This allows additional data to be sent in the first TDM time slot when the slot ACK/NACK is not required.

When the destination node 130 receives a message from the source node 120, at step 520, the destination node 130 determines whether the source node 120 expects a reply message from the destination node 130.

For example, the destination node 130 can determine that source node 120 does not expect, require or want a reply (e.g., ACK message or NACK message) to be sent in the second portion of the same first TDM time slot if a negative reply expectation message (e.g., a do not reply indication in the reply expectation message) is received. In this case, the destination node 130 anticipates or expects that the variable time gap and the second portion of the same first TDM slot will also be used for data transmission by the source node 120 (e.g., because the destination node 130 received a negative reply expectation message in the beginning portion of the first TDM time slot). The process then proceeds to step 530, where the destination node 130 can receive data in a first portion of the first TDM time slot and additional data that the source node 120 has sent in the variable time gap and acknowledgment portions of the first TDM time slot. The process then ends at step 540.

Conversely, the destination node 130 can determine that source node 120 expects or wants a reply (e.g., ACK message or NACK message) to be sent in the second portion of the same first TDM time slot if a positive reply expectation message (e.g., a reply expected indication in the reply expectation message) is received in the beginning portion of the first TDM time slot. In this case, destination node 130 can assume that the source node 120 has reserved the second (e.g., last) portion of the same first TDM time slot for the destination node 130 to transmit an indication message to the source node 120 in the last portion of the same first TDM time slot. Thus, if at step 520 the destination node 130 determines that the source node 120 expects a reply message from the destination node 130, then the process proceeds to step 545, where the destination node 130 can receive data in a first portion of the first TDM time slot. The process then proceeds to step 550, where the destination node 130 can decode the data and determine whether the data from the source node 120 has arrived properly (e.g., that data were received correctly without errors).

The destination node 130 can then transmit information (e.g., an indication message) to the source node 120 in the reserved, second (e.g., last) portion of the same first TDM time slot which indicates whether the data from the source node 120 has arrived properly at the destination node 130. In one implementation, the destination node 130 sends the ACK message or NACK message at the end of (e.g., last portion of) the same first TDM time slot, however, the ACK message or NACK message could also be transmitted near the last portion or part of the first TDM time slot and other information can be transmitted in the last part of the first TDM time slot.

For example, when the destination node 130 determines that the data from the source node 120 has not arrived properly at the destination node 130, then at step 560, the destination node 130 can transmit a negative acknowledgement (NACK) message from the destination node 130 to the source node 120 in the second portion of the same first TDM time slot to indicate that the data from the source node 120 has not arrived properly at the destination node 130.

Alternatively, when the destination node 130 determines that the data from the source node 120 has arrived properly at the destination node 130, then at step 570, the destination node 130 can transmit an acknowledgement (ACK) message from the destination node 130 to the source node 120 in the second portion of the same first TDM time slot to acknowledge that the data from the source node 120 has arrived properly at the destination node 130.

The process 500 then ends at step 540. Upon receiving the status information (e.g., ACK or NACK or no response), the source node 120 may report the status information to a higher layer which can decide what to do based on the status information (e.g., either discard or perform an ARQ to retransmit).

In one implementation, the source node 120 assumes that the data from the source node 120 has not arrived properly at the destination node 130 if an acknowledgement (ACK or NACK) message is not received from the destination node 130 in the second portion of the same first TDM time slot by the end of the time slot, or it can be assumed there is no reply.

Thus, to optimize a TDM system, time slot acknowledgement techniques are provided which are performed by the physically layer (PHY) and reported to the medium access control (MAC) layer (as part of the transmit status) to make the upper signaling layers in a TDM system work more efficiently (e.g., improving efficiency of upper protocol layers). Among other things, these time slot acknowledgement techniques can be used by the MAC for virtual collision detection.

Exemplary Implementation

One exemplary implementation of these techniques will now be described to illustrate how these techniques can be applied in one non-limiting scenario.

Every time slot transmission can be acknowledged within the time slot by the addressed destination node 130 of FIG. 1. To send the acknowledgement, the destination node 130 can determine that a time slot acknowledgement is required, determine that it's node address was indeed the intended destination, switch the radio frequency (RF) channel from receive to transmit, transmit the reverse training sequence, decode the time slot payload without errors and transmit the ACK (or NACK) to the source node 120. The transmit user data can include a flag that identifies whether the source node 120 requires the time slot acknowledgement from the destination node 130. This bit can be copied from the user data into the first control burst following the time slot forward training sequence. The transmit user data can include the shorthand destination node 130 identifier. This identifier can be copied from the user data into the second control burst following the time slot forward training sequence. Both the flag and shorthand destination node 130 identifier can be carried outside the forward error correction (FEC) payload for timely processing by the destination node 130.

At the end of the time slot, the RF channel is turned around, and the addressed destination node 130 sends an ACK if the payload was received and decoded without errors. The destination node 130 can send a NACK message if a message was detected but could not be decoded error-free. The addressed destination node 130 can immediately switch the RF channel from receive to transmit within the variable RX/TX time gap, and immediately begin transmitting the reverse training sequence (e.g., three (3) symbols). A single control burst follows the training sequence to carry the ACK message or NACK message. The forward payload can be decoded during the variable RX/TX time gap and the reverse training sequence. Successful decode (e.g., no errors) can result in an ACK message in the control symbol, and errors can result in a NACK message in the control symbol. The default can be NACK message, so that if the decode decision is late, the time slot can not be falsely acknowledged.

At the source node 120, receipt of the ACK ensures there was no collision between the source and destination, a NAK indicates a reception error, and lack of receipt implies a collision.

In the foregoing specification, specific embodiments of the present invention have been described. However, one of ordinary skill in the art appreciates that various modifications and changes can be made without departing from the scope of the present invention as set forth in the claims below. For example, while the techniques described above can improve performance in any TDM system, the techniques can be particularly useful in TDM systems which support ad-hoc networks. Thus, while the disclosure relates to techniques for improving efficiency of upper protocol layers in any TDM system, in one possible implementation, these techniques can be implemented, for example, in a system such as that disclosed in U.S. Pat. Publication Number 2007/0211686A1, entitled "System, Method And Apparatus For Reliable Exchange Of Information Between Nodes Of A Multi-Hop Wireless Communication Network" published on Sep. 13, 2007 and assigned to the assignee of the present invention, its contents being incorporated by reference in its entirety herein.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. In time division multiplex (TDM) network comprising a source node and a destination node, a method comprising:
    dividing a TDM time slot into a first portion, a second portion, and a variable time gap, wherein the variable time gap is between the first portion and the second portion of the TDM time slot, and wherein the TDM time slot is a bi-directional channel;
    transmitting data from the source node to the destination node in the first portion of the TDM time slot, wherein the second portion of the same TDM time slot is reserved for the destination node to transmit information to the source node.

2. A method according to claim 1, further comprising:
    determining at the destination node whether the data from the source node has arrived properly; and
    transmitting an indication message from the destination node to the source node in the second portion of the same TDM time slot to indicate whether the data from the source node has arrived properly at the destination node.

3. A method according to claim 2, wherein transmitting an indication message from the destination node to the source node in the second portion of the same TDM time slot to indicate whether the data from the source node has arrived properly at the destination node, comprises:
    transmitting an acknowledgement message from the destination node to the source node in the second portion of the same TDM time slot to acknowledge that the data from the source node has arrived properly at the destination node.

4. A method according to claim 2, wherein transmitting an indication message from the destination node to the source node in the second portion of the same TDM time slot to indicate whether the data from the source node has arrived properly at the destination node, comprises:
    transmitting a negative acknowledgement message from the destination node to the source node in the second portion of the same TDM time slot to indicate that the data from the source node has not arrived properly at the destination node.

5. A method according to claim 3, wherein the source node assumes that the data from the source node has not arrived properly at the destination node if the acknowledgement message is not received from the destination node in the second portion of the same TDM time slot.

6. A method according to claim 1, wherein the source node indicates in the first portion of the TDM time slot whether an indication message is expected from the destination node in the second portion of the same TDM time slot.

7. A method according to claim 1, wherein the source node indicates in the first portion of the TDM time slot whether the variable time gap and the second portion of the same TDM time slot are used to transmit data from the source node to the destination node.

8. A source node, comprising:
    a transmitter configured to transmit data to a destination node in a first portion of a time division multiplex (TDM) time slot, wherein a second portion of the same TDM time slot is reserved for the destination node to transmit information to the source node, wherein the TDM time slot includes the first portion, the second portion, and a variable time gap, and wherein the variable time gap is between the first portion and the second portion of the TDM time slot; and
    a receiver configured to receive information from destination node in the second portion of the same TDM time slot, wherein the TDM time slot is a bi-directional channel.

9. A source node according to claim 8, wherein the information comprises an indication message which indicates whether the data from the source node arrived properly at the destination node.

10. A source node according to claim 9, wherein the indication message comprises an acknowledgement message to acknowledge that the data from the source node has arrived properly at the destination node.

11. A source node according to claim 10, wherein the source node assumes that the data from the source node has not arrived properly at the destination node if the acknowledgement message is not received from the destination node in the second portion of the same TDM time slot.

12. A source node according to claim 9, wherein the indication message comprises a negative acknowledgement message which indicates that the data from the source node has not arrived properly at the destination node.

13. A source node according to claim 8, wherein the source node indicates in the first portion of the TDM time slot whether an indication message is expected from the destination node in the second portion of the same TDM time slot.

14. A source node according to claim 8, wherein the source node indicates in the first portion of the TDM time slot whether the variable time gap and the second portion of the same TDM slot are used to transmit data from the source node to the destination node.

15. A destination node comprising:
    a receiver configured to receive, from a source node, data in a first portion of a time division multiplex (TDM) time slot, wherein the TDM time slot is a bi-directional channel; and
    a transmitter configured to transmit information to the source node in a second portion of the same TDM time slot, wherein the TDM time slot includes the first portion, the second portion, and a variable time gap, and wherein the variable time gap is between the first portion and the second portion of the TDM time slot.

16. A destination node according to claim 15, further comprising:
    a processor configured to determine whether the data from the source node has arrived properly at the destination node, and wherein the information comprises an indication message which indicates whether the data from the source node has arrived properly at the destination node.

17. A destination node according to claim 16, wherein the indication message comprises an acknowledgement message which acknowledges that the data from the source node has arrived properly at the destination node.

18. A destination node according to claim 16, wherein the indication message comprises a negative acknowledgement message which indicates that the data from the source node has not arrived properly at the destination node.

19. A destination node according to claim 15, wherein the source node indicates in the first portion of the TDM time slot whether an indication message is expected from the destination node in the second portion of the same TDM time slot.

20. A destination node according to claim 15, wherein the source node indicates in the first portion of the TDM time slot whether the variable time gap and the second portion of the same TDM time slot are used to transmit data from the source node to the destination node.

* * * * *

UNITED STATES PATENT AND TRADEMARK OFFICE
CERTIFICATE OF CORRECTION

PATENT NO. : 7,561,542 B2  Page 1 of 1
APPLICATION NO. : 11/383013
DATED : July 14, 2009
INVENTOR(S) : Alapuranen et al.

It is certified that error appears in the above-identified patent and that said Letters Patent is hereby corrected as shown below:

On the Title Page, in Item (75), under "Inventors", in Column 1, Line 1, delete "Detona," and insert -- Deltona, --, therefor.

Signed and Sealed this

Twelfth Day of October, 2010

David J. Kappos
*Director of the United States Patent and Trademark Office*